Figure 1:
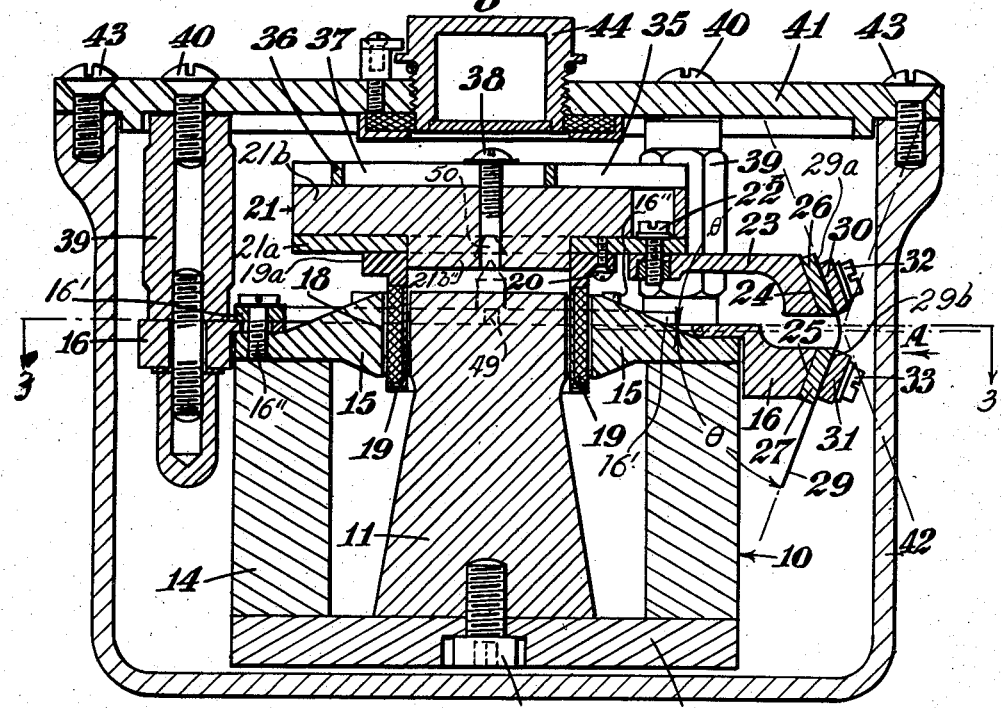

July 8, 1958

W. M. JONES 2,842,752

GEOPHONES

Filed Aug. 12, 1954

2 Sheets-Sheet 1

INVENTOR:
WILLIAM MELANCTHON JONES
BY Morgan, Finnegan, Durham & Pine
ATTORNEYS

July 8, 1958 W. M. JONES 2,842,752
GEOPHONES
Filed Aug. 12, 1954 2 Sheets-Sheet 2
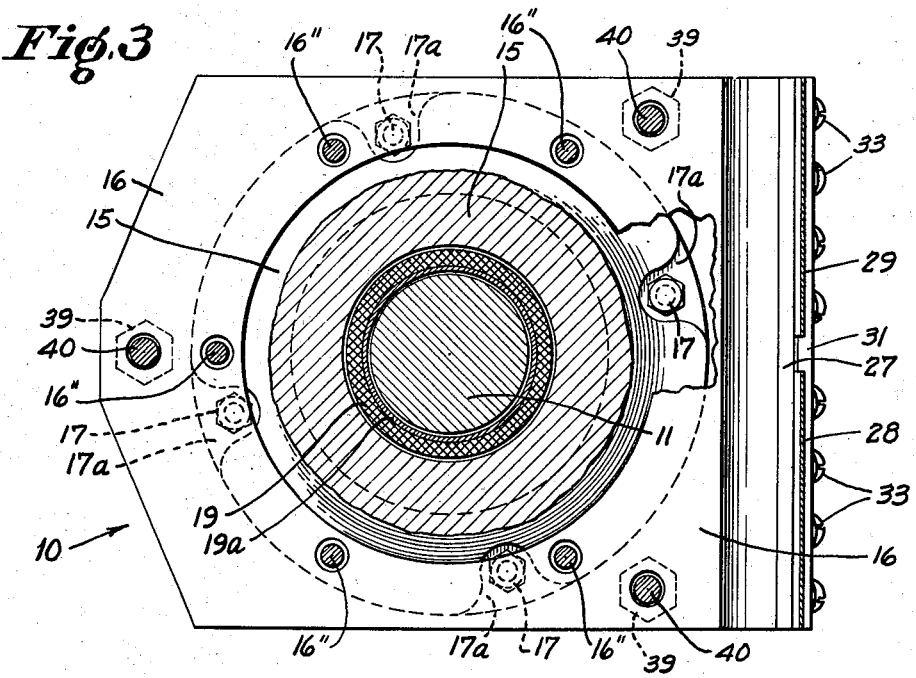
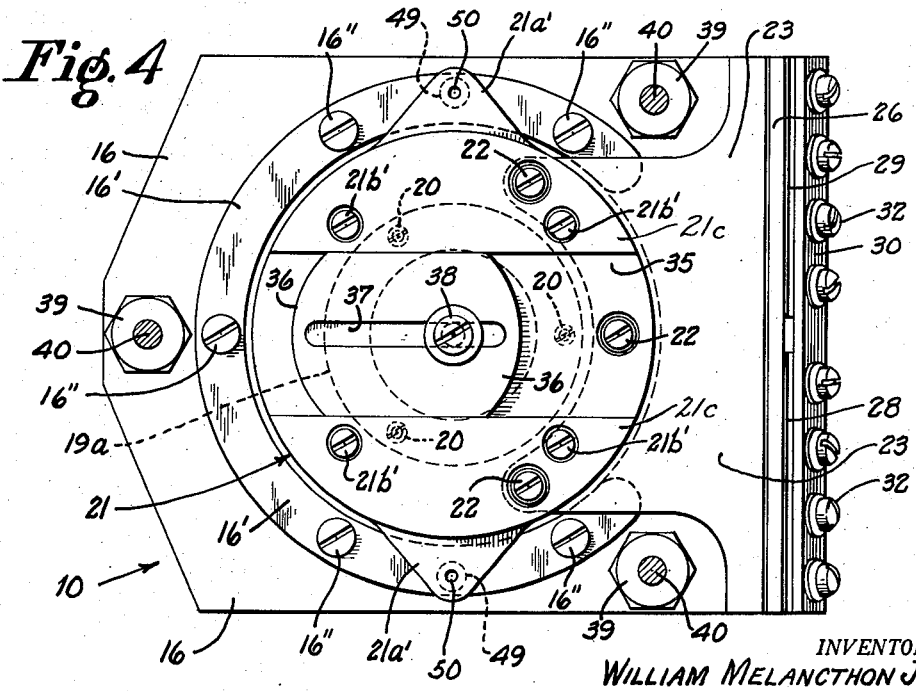
INVENTOR.
WILLIAM MELANCTHON JONES
BY
Morgan, Finnegan, Durham & Pine
ATTORNEYS.

United States Patent Office 2,842,752
Patented July 8, 1958

2,842,752
GEOPHONES

William Melancthon Jones, Nottingham, England, assignor to The British Petroleum Company Limited Application August 12, 1954, Serial No. 449,300

Claims priority, application Great Britain September 9, 1953

9 Claims. (Cl. 340—17)

This invention relates to moving-coil geophones for use in refraction surveying.

Moving-coil geophones for detecting the vertical component of ground vibrations usually consist of a weighted coil or wire which is elastically suspended in such a way that it may move vertically in an annular magnetic airgap in a permanent magnet when the geophone has been levelled for use, i. e. with the axes of the coil and airgap vertical. The natural frequency of the elastic suspension of the weighted coil is often required to be small, say less than 6 c./s. Such a requirement arises when the frequency of the ground vibrations is low, as in long distance refraction surveying, or whenever there is a need for the greatest accuracy in amplitude and phase response to ground vibrations of higher frequency. A coil suspension in the usual form of a helical spring becomes very long when its natural frequency is reduced and so increases the size and weight of the instrument. In addition, a device to centre the coil in the annular gap of the magnet is required which increases the complication of the instrument and also adds stiffness to the main spring which then requires corresponding increase in length.

Arrangements have recently been shown in which the coil is suspended by means of leaf springs but in such instruments the difficulty has been to combine compactness and lightness with sensitivity and a good low frequency response. It has also been difficult to provide the necessary stiffness of the suspension in a horizontal direction without the use of a centering device for the coil.

The principal object of the present invention is, therefore, to provide a field geophone of a low natural frequency, that is to say, below about 4 c./s., to record the vertical component of ground vibration, in which the functions of a short suspension and the centering device are combined in such a way as to produce an instrument which is considerably smaller and lighter, and which has simpler means of initial adjustment, than geophones commonly in use at the present time.

According to the invention, there is provided a moving coil geophone wherein the coil is concentrically suspended in an annular magnetic airgap in a magnet by means of a single leaf spring maintained in a flexed condition by means of an inertia mass, the suspension being such that the coil has freedom of movement only in the direction of the axis of the airgap.

According to a preferred form of construction, the geophone comprises a permanent magnet formed with an annular magnetic airgap the axis of which is vertical in the position of use of the geophone, a coil, an inertia mass secured to the coil, a lever arm secured at one end to the inertia mass and at the other end to a single flat leaf spring which is also secured relatively to the permanent magnet, the leaf spring being maintained by the weight of the inertia mass in a flexed condition such that the coil is concentrically suspended in the annular airgap in which it is free to oscillate in a vertical direction only.

Preferably, the degree to which the leaf spring is flexed is such that the natural frequency of the suspension is less than about 4 c./s.

Advantageously, the leaf spring is held in a flexed condition between two pairs of flat clamping strips, one pair being secured relatively to the lever arm and the other pair being secured relatively to the permanent magnet, the one pair of strips being set at an angle to the other pair. The spring may be secured between the strips by means of screws passing through holes in the strips and spring, the holes in the spring being of larger diameter than the screw shafts whereby adjustments in the balance of the coil and inertia mass may be made. The extent to which the spring is flexed from its normal flat condition is determined by the angle at which the two pairs of strips are set to one another and the extent of flexing governs the natural frequency of oscillation of the coil and inertia mass. Thus the strips may be set at the angle required to give the desired natural frequency. Preferably each pair of strips may be set at the same angle to the horizontal.

By "single leaf spring" is meant either one leaf spring only or two or more leaf springs acting as one leaf spring as in the embodiment to be described shortly where the two springs 28 and 29 act in the same way as a single spring formed by joining them together along their adjacent edges. The purpose of dividing the single leaf spring into two or more sections (so to speak) is merely to facilitate spring replacement.

The inertia mass may be provided with a movable rider for making adjustments in the balance of the inertia mass while the instrument is being used in the field.

The instrument may conveniently be housed in a container provided with a clamping device which prevents movement of the coil and inertia mass when the instrument is not in use.

Figure 2:
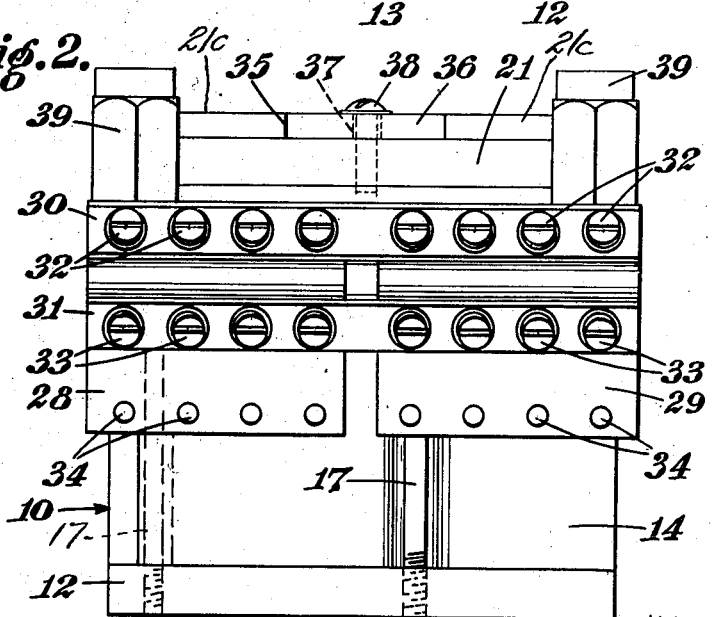

The invention will now be described by way of example with reference to the accompanying drawings in which Figure 1 is a vertical section through the centre of the geophone and its container, Figure 2 is a view in the direction of arrow A in Figure 1 of the geophone with the container removed, Fig. 3 is a view in section of the geophone with the container removed, taken along the line 3—3 of Fig. 1, Fig. 4 is a view in plan of the geophone of Fig. 1 with the container removed.

The geophone consists of a permanent magnet 10 comprising a central member 11 secured to a base plate 12 by means of a screw 13, an annular outer member 14, a ring member 15 and a top plate 16. Bolts 17 passing between plate 12 and ring member 15 hold the parts 12, 14 and 15 together. The ring member 15 is provided with recesses 17a in its upper surface to receive the heads of the bolts 17. The top plate 16 is clamped to the ring member by a C-ring 16′ through which screws 16″ pass into threaded engagement with the ring member 15. Ring member 15 forms with central member 11 an annular gap 18, the axis of which is vertical and in which is located an annular signal coil 19. Coil 19 is carried by a flanged tubular attaching fitting 19a secured by screws 20 to an inertia mass 21 which, in turn, is secured by screws 22 to lever arm 23. Advantageously, the inertia mass 21 may be of sectional construction as shown and comprise an annular bed section 21a to which the coil attaching fitting 19a is secured, and a slotted balancing section 21b. The bed section 21a is fixedly secured to the balancing section 21b by screws (not shown). A boss 21b″ on the balancing section 21b is telescopically snugly received within the tubular coil fitting 19a. Lever arm 23 and top plate 16 have flat inclined faces 24 and 25, respectively to which are secured flat metal clamping strips 26 and 27, respectively. Flat leaf springs 28 and 29 are clamped in position as shown by means of flat metal clamping strips 30 and 31 secured by screws 32 and 33. The two leaf springs 28 and 29 act in the same way as a single leaf spring formed by joining them together along their adjacent edges. They are (so to speak) sections of a "single leaf spring," as above mentioned. The springs 28 and 29 thus act as a hinge for the lever arm 23, inertia mass 21 and coil 19 and when the parts are correctly assembled coil 19 is positioned concentrically in the annular gap 18 and is free to oscillate therein in a vertical direction only. In order to allow for the position of the coil to be adjusted accurately and for adjustments which become necessary due to fatiguing of springs 28 and 29, the holes in the springs 28 and 29 through which the screws 32 and 33 pass are made larger than the shafts of the screws. Each spring is dimensioned to extend below the clamping strips 30 and 31 and is provided with a series of holes 34 so that when the upper half of a spring has become useless through fatigue the spring may be reversed and the lower half used. The portions of the springs secured between strips 26 and 30 and strips 27 and 31 are, as indicated with reference to the dash-dot lines in Fig. 1, inclined at identical angles $\theta$ to the horizontal when the instrument has been levelled correctly for use with the axes of the coil 19 and annular gap 18 vertical. The leaf springs 28 and 29 are each flexed but each spring in its normal, unflexed, state is flat. As will be seen from Fig. 1, the leaf spring 29 there shown, is flexed, by the weight of the lever arm 23, inertia mass 21 and coil 19, between the spring part 29a secured between strips 26 and 30 and the spring part 29b secured between strips 27 and 29, from its normally flat state into a state of curvature without a point of inflection. The same condition obtains with respect to the spring 28. In this particular geophone the spring clamping strips 26, 27, 30 and 31, and therefore the portions of the springs clamped between them, have been set at 68° to the horizontal so that when the inertia mass is in equilibrium and the coil moves freely in the vertical direction, the natural period of the inertia mass oscillation is approximately 1.8 c./s. The equilibrium position of the coil and inertia mass is such that the inertia mass is horizontal and the axis of the coil vertical. In order to allow for fine adjustments in the balance of the inertia mass such as become necessary due to fatigue of the springs during use of the instrument in the field, the balancing section 21b of the inertia mass 21 is provided with a slot 35 in its upper surface in which is slidably located a rider 36 itself having a central slot 37 through which the shaft of a screw 38 passes. The slot 35 may be formed by spaced-apart guide members 21c as depicted in Figs. 2 and 4, the guide members being removably secured in place as by screws 21b′.

The top plate 16 has secured thereto three pillars 39 which are hollow inside and internally threaded at their upper ends to enable the geophone to be secured by means of three screws 40 to the lid 41 of a container 42 for the instrument. The lid 41 is screwed on to the container 42 by means of screws 43. A spirit level (not shown) is provided in the lid to enable the instrument in its container to be set horizontal. Leads (not shown) from the coil 19 communicate with a socket (also not shown) in the lid. The signal from the coil is conveyed to an amplifier by means of a cable which plugs into the socket. The lid is provided with a clamping plug 44 which can screw down to bear against screw 38 so as to clamp the inertia mass against a pair of studs 49 mounted on the C-ring 16′ and prevent the inertia mass moving when the instrument is not being used. Advantageously, the bed plate 21a may be provided with a pair of lobes 21a′ located at diametrically opposite points, each lobe having an opening 50 adapted to receive the stud 49. Preferably, the studs 49 are provided with conical top portions adapted to enter the openings 50 of matching configuration. No centering device is necessary to maintain the coil's concentric position in the annular gap as the leaf spring suspension ensures this by virtue of its stiffness in all horizontal directions. All screw joints are provided with shakeproof washers.

The expressions "vertical" and "horizontal" when used in the specification and claims to describe the position or movement of parts of the geophone are to be taken as applying to the geophone when it has been levelled for use, i. e. with the axis of the annular gap vertical.

References in the specification and claims to the setting of the clamping strips are to be taken as applying to the geophone when it has been levelled for use and when the coil, inertia mass and lever arm are balanced in their equilibrium position.

I claim:

1. A low frequency, moving coil geophone comprising a magnet having an annular magnetic airgap, an inertia mass, a coil secured to the inertia mass, and a single leaf spring which is flexed but which in its normal, unflexed, state is flat, one part of the leaf spring being secured relatively to the inertia mass and another part being secured relatively to the magnet, the leaf spring being flexed, by the weight of the inertia mass and coil, between the parts where it is secured, from a normally flat state into a state of curvature without a point of inflection, and the coil being concentrically suspended in the airgap by means of the single leaf spring in such manner that the coil has freedom of movement only in the direction of the axis of the airgap.

2. A geophone according to claim 1, in which the degree to which the leaf spring is flexed from its normal flat state is such that the natural frequency of oscillation of the coil and inertia mass is less than four cycles per second.

3. A geophone according to claim 1, comprising a plurality of leaf springs acting as a single leaf spring.

4. A moving-coil geophone according to claim 1, in which the inertia mass is provided with a movable rider for making adjustments in its balance.

5. A low frequency, moving-coil geophone comprising a permanent magnet having an annular airgap the axis of which is vertical in the position of use of the geophone, an inertia mass, a coil secured to the inertia mass, a lever arm secured at one end to the inertia mass, and a single leaf spring which in its normal, unflexed, state is flat, one part of the leaf spring being secured to the other end of the lever arm and another part being secured relatively to the magnet, the leaf spring being flexed by the weight of the lever arm, inertia mass and coil, between the parts where it is secured, from its normal flat state into a state of curvature without a point of inflection, and the coil being concentrically suspended in the airgap by means of the single leaf spring in such manner that it has freedom of movement only in the vertical direction.

6. A geophone according to claim 5, in which the degree to which the leaf spring is flexed from its normal flat state is such that the natural frequency of oscillation of the coil and inertia mass is less than four cycles per second.

7. A moving-coil geophone according to claim 5, comprising two pairs of flat clamping strips, one pair being secured relatively to the lever arm and the other pair being secured relatively to the permanent magnet, the leaf spring being secured between the clamping strips and the one pair of clamping strips being set at an angle to the other pair so as to determine the degree to which the spring is flexed from its normal flat condition.

8. A moving-coil geophone according to claim 7, in which pair of strips is set at the same angle to the horizontal.

9. A moving-coil geophone according to claim 7, in which the spring is secured between the strips by means of screws passing through holes in the spring and strips, the holes in the spring being of larger diameter than the screw shafts whereby adjustments in the balance of the coil and inertia mass may be made.

References Cited in the file of this patent

UNITED STATES PATENTS

| | | |
|---|---|---|
| 2,303,413 | Washburn | Dec. 1, 1942 |
| 2,582,769 | Congdon | Jan. 15, 1952 |
| 2,591,795 | Eisler | Apr. 8, 1952 |
| 2,636,160 | Loper | Apr. 21, 1953 |
| 2,675,533 | Brown | Apr. 13, 1954 |

UNITED STATES PATENT OFFICE

CERTIFICATE OF CORRECTION

Patent No. 2,842,752                                July 8, 1958

William Melancthon Jones

It is hereby certified that error appears in the printed specification of the above numbered patent requiring correction and that the said Letters Patent should read as corrected below.

Column 5, line 7, for "which pair" read -- which each pair --.

Signed and sealed this 30th day of August 1960.

(SEAL)
Attest:
ERNEST W. SWIDER
Attesting Officer

ROBERT C. WATSON
Commissioner of Patents